Nov. 28, 1961 P. M. SMITH 3,010,156
AUTOMATIC VALVE AND DEGATE NOZZLE FOR
THERMOPLASTIC INJECTION MACHINES
Filed Feb. 13, 1959 3 Sheets-Sheet 1
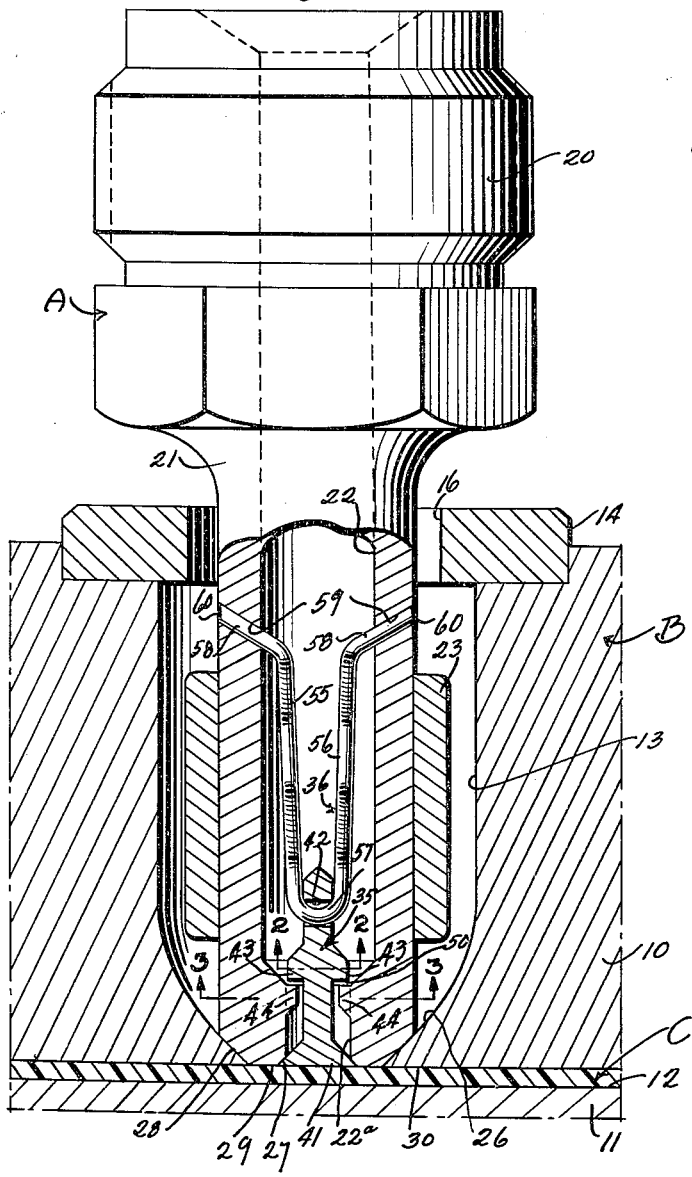
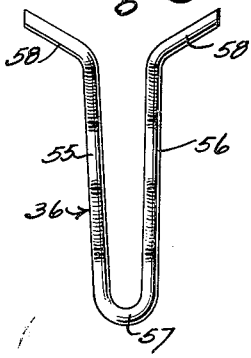
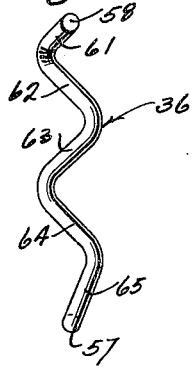
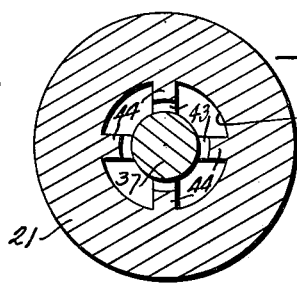
INVENTOR
Paul M. Smith,
BY
ATTORNEYS

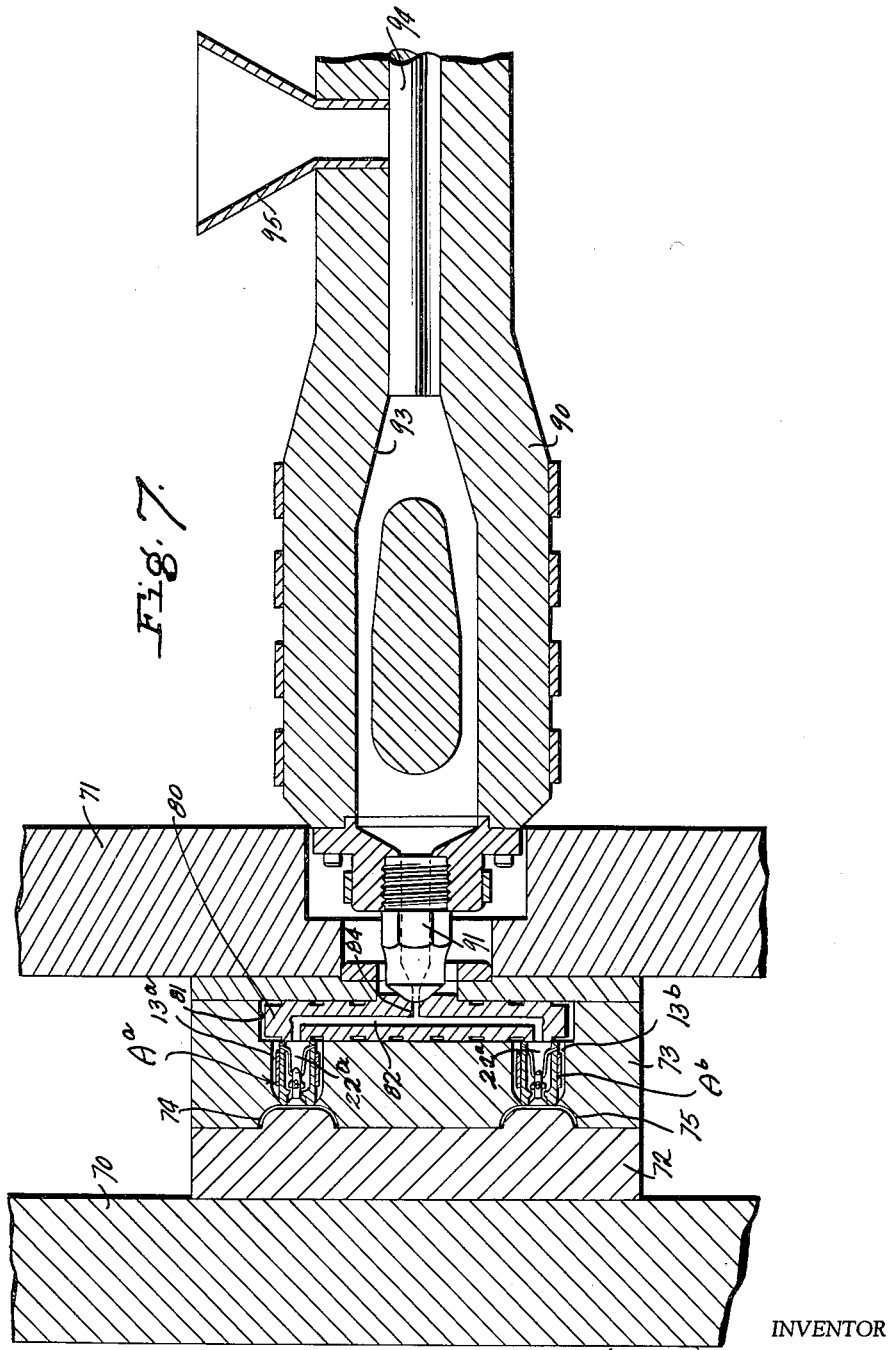

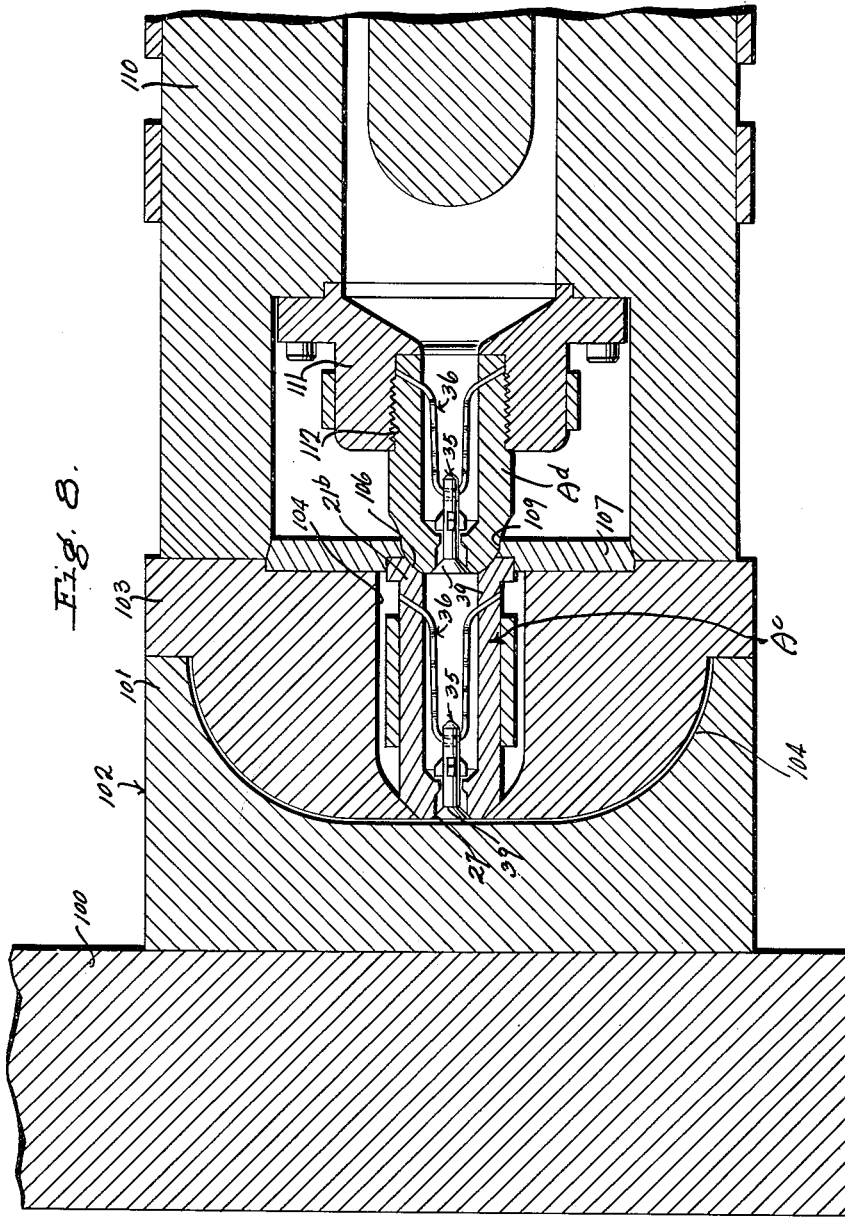

United States Patent Office 3,010,156
Patented Nov. 28, 1961

3,010,156
AUTOMATIC VALVE AND DEGATE NOZZLE FOR
THERMOPLASTIC INJECTION MACHINES
Paul M. Smith, 1405 Wheeling Ave., Cambridge, Ohio
Filed Feb. 13, 1959, Ser. No. 793,164
8 Claims. (Cl. 18—30)

This invention relates to improvements in a machine for injection molding of thermoplastics, and in and to the details thereof.

A further object of this invention is the provision of a valved nozzle assemblage for injection molding machines which can be used for controlling the flow of plastic to mold parts and by means of which it is possible to obtain a better plastic part at faster cycle operation than with conventional plastic molding machines.

A further object of this invention is the provision of a valve and degate nozzle for thermoplastic injection molding machines by means of which it is possible to mold a plastic part having a better appearance at the locus of plastic feed than it is possible to obtain with conventional molding machines.

A further object of this invention is the provision of an injection molding machine having an improved valve and degate nozzle which will permit a machine operator to spend a maximum time packing molding parts.

A further object of this invention is the provision of an improved valve and degate nozzle for thermoplastic injection molding machines which is automatic in operation and of such construction as to eliminate sinks in the molded part ordinarily due to the material flowing back into the injection cylinder.

A further object of this invention is the provision of an improved valve and degate nozzle assembly which includes a nozzle body and a plastic regulating valve therefor with an improved spring arrangement, normally under tension at all times, and capable of flexing under the pressure or thrust of the flowing plastic to enable opening of the valve slowly under injection pressure, which, when equalized in the mold, will cause the valve to snap shut while pressure still remains in the injection cylinder, and thus eliminating sinks in the molded part.

A further object of this invention is the provision of improved valves for controlling the flow of plastic material by means of a hot runner located at the mold sites of a multiple unit mold, and which insures accurate control of the plastic in order to provide perfect molded parts.

A further object of this invention is the provision of an improved valve nozzle assemblage for use in an injection machine which utilizes a retractable heating cylinder.

Other objects and advantages of this invention will be apparent during the course of the following detailed description.

In the accompanying drawings, forming a part of this specification, and wherein similar reference characters designate corresponding parts throughout the several views:

FIGURE 1 is a fragmentary view, partly in side elevation and partly in section, showing an improved automatic valve and degate nozzle associated with a mold unit.

FIGURE 2 is an enlarged transverse cross sectional view taken through a lug provided portion of the valve of the improved nozzle of FIGURE 1, substantially on the line 2—2 of FIGURE 1.

FIGURE 3 is an enlarged transverse cross sectional view taken substantially on the line 3—3 of FIGURE 1 and more particularly showing the stop lugs of the nozzle body and the valve at this location.

FIGURE 4 is a side elevation of the improved valve of the nozzle assemblage shown in FIGURE 1.

FIGURE 5 is a front elevational view of an improved type of spring used in the nozzle assemblage for holding the valve in normally closed position.

FIGURE 6 is a side elevation of the spring of FIGURE 5.

FIGURE 7 is a longitudinal cross sectional view taken through a multiple nozzle hot runner assemblage for injection molding machines having an improved plastic flow valve and degate nozzle located at each of the mold sites of the unit.

FIGURE 8 is a fragmentary longitudinal cross sectional view showing the improved valve and degate nozzle used in a mold structure for controlling flow of plastics to the molding area and also having associated therewith a retractable heating cylinder upon which is likewise mounted a complementary improved valve and degate nozzle for feeding of and control of plastics with respect to the nozzle of the mold, for the purpose of preventing drool of the plastic upon retraction of the heating cylinder.

In the drawings, wherein are shown several applications of the improved valve and degate nozzle upon thermoplastic injection molding machines, the letter A may generally designate the improved nozzle, used in a mold assemblage B for controlling the flow and cut-off of thermoplastic materials for the production of a perfectly formed molded part C.

Referring to the application shown in FIGURES 1 to 6, inclusive, the mold assemblage B preferably comprises parts 10 and 11 which are formed in such manner as to provide a mold cavity 12 of a desired wall thickness or shape in which the plastic part C is to be molded. The mold unit part 10 is preferably provided with a socket or recess 13 to receive the valved end of the nozzle A. A nozzle register or locating ring 14 may be provided upon the mold part 10 having a passageway 16 therein to receive the nozzle in the manner shown in FIGURE 1, or this ring 14 may be shaped to receive thereagainst a conventional main heater nozzle, or otherwise shaped to receive thereagainst a nozzle of a retractable heating cylinder type of assemblage, such as shown in FIGURE 8.

In the form of invention shown in FIGURE 1, the nozzle A preferably includes the outer structure 20, such as is conventional upon main press heater nozzles, and it also includes the lower tubular body portion 21 having a passageway 22 therethrough for receiving the flowing plastic on its way to the mold site. The body portion 21 is adapted to be seated in the mold socket or recess 13. It has a conventional electrical resistance heating band 23 thereon. The socket or recess 13 has a tapered convergent bottom surface leading to a bottom opening, which is appreciably restricted in diameter with respect to the diameter of the main part of the recess 13. The lower end of the nozzle tip 21 is tapered or spherically shaped at 28 for seating on the convergent surface 26, and when so seated the lower end surface 29 of the nozzle body 21 lies in the same plane and flush with the bottom surface 30 of the mold part 10.

The nozzle tip 21 is provided in its passageway 22 with a novel type of valve 35, shown in detail in FIGURE 4, and a spring 36 associated therewith which is attached fixedly to the nozzle tip 21 and of itself supports the valve 35 in position in the passageway 22 for flexible linear or reciprocable movement therein.

The valve 35 includes a stem or body portion 37, generally cylindrical in shape having an upper tapered pointed end 38 and a lower flaring valve head 39 which is of frusto-conical formation and tapers divergently; terminating in a flat bottom surface 41 in a plane at right angles to the axis of the body 37. The lower end of the nozzle 21 is provided with a downwardly flaring or tapered annular valve seat 27 upon which the tapered surface of the head 39 seats to close off the passageway 22. Under such circumstances, the surface 41 lies in the same plane as the bottom surface 29 of the valve nozzle tip 21, as shown in FIGURE 1. The stem or body 37 of the valve is provided with an elongated opening 42, adapted to receive the spring 36 therethrough in a manner to be subsequently described. The edges of the seat 27 are sharp and also the annular edge of the surface 41.

The body 37 of the valve 35 is provided with radially extending lugs 43 which are circumferentially spaced, and the thickness and lengths of which are such as to cooperate with complementary lugs 44 provided upon the nozzle body 21 in inwardly extending and radially projecting relation in the lower reduced passageway portion 22$^a$ of the nozzle tip 21. The relative circumferential spacing of the motion limiting lugs 43 and 44 is such that the valve 35 can be readily assembled in the nozzle by slipping the lugs 43 through the spaces between the lugs 44, but when in operating position, the spring 36 will not twist or turn to thereby hold the valve 35 so the lugs 43 and 44 are in direct alignment at all times for the purpose of limiting linear travel of the valve 35. Thus, as is shown in FIGURE 1, there is a space 50 between the lugs 43 and 44, when the valve head 39 is seated in closed relation upon the valve seat 41. The lugs 43 and 44 are in direct alignment and this space 50 determines the extent to which the valve head can be moved off of its seat 27 to permit plastic to flow into the mold recess 12.

When molding thin plastic parts, the travel of the valve 35 in its nozzle is limited to about 1/64 of an inch, which may be increased to as much as 1/16 of an inch when molding heavily walled parts.

The spring 36 is of unique construction, in elevation being of a U- or V-shaped formation, as shown in FIGURE 5, and comprising the legs 55 and 56 connected by a U-shaped bight portion 57. Each of the legs at their upper ends is provided with obliquely angled attaching extensions 58 adapted to be extended into bores 59 provided through the walls of the nozzle tip 21. The outer ends of these extensions 58 are exposed upon the exterior of the nozzle tip 21 and are welded at the locations 60 in order to firmly secure the spring 36 in proper alignment in the passageway 22, as shown in FIGURE 1. The bight end 57 projects through the passageway 42 of the valve 35.

A novel characteristic of the spring 36 is the fact that each leg 55 and 56 is sinuously or zig zag shaped from the extension 58 to the bight portion 57. Thus, it is shown in FIGURE 6 that each leg includes the portion 61 extending obliquely out of the general line of the legs as shown in FIGURE 5 and at 62 a length extends in approximately right angled relation to the portion 61 and then the portion 63 extends in parallelism with the portion 61 and at right angles to the portion 62, and the portion 64 is approximately at right angles to the portion 63, the lower portion 65 deflecting laterally the same as the portions 61 and 63 and terminating at the bight portion 57. This sinuousness or wavey like appearance of the legs 55 and 56 gives the necessary longitudinal resiliency to the spring legs in order to maintain the spring under tension at all times whether the valve 35 is in closed position shown in FIGURE 1 or in opened position during injection of the plastic. The fact that the spring is anchored at its upper ends and due to its shape prevents turning thereof, whereby the pairs of lugs 43 and 44 are always maintained in direct alignment.

With the use of the valve of this invention it is not necessary to hold injection pressure until the plastic cures enough to freeze off and prevent plastic flow-back into a runner.

In operation, the plastic is fed by the injection ram of the machine upon which the nozzle is used and the pressure caused by the ram will open the valve because of the longitudinal flexing of the legs 55 and 56 of the spring 36. It takes several hundred pounds per square inch of pressure in the nozzle in order to open the valve 35. Remember that the spring 36 is always under tension and as soon as the pressure is equalized, due to filling of the mold cavity, the valve will automatically snap to closed position and hold the original packed pressure in the molding area. Inasmuch as the surfaces of the mold are water cooled in the molding area, the molded part is chilled but the interior is still plasticized and ordinarily this would feed back through the gate or valve if not closed. With this construction the mold part can be removed from the mold a few seconds earlier, due to the quick action of the valve of the improved nozzle.

Referring to FIGURE 7, the same shows a multiple nozzle type type hot runner. The numeral 70 indicates a movable platen and 71 a stationary platen between which the mold unit comprising the parts 72 and 73 is disposed. The molding sites are indicated at 74 and 75, and they may be in any desired number; the mold part 73 being socketed or recessed at 13$^a$ and 13$^b$ the same as for the mold B above described, to receive therein nozzles A$^a$ and A$^b$ which are generally constructed the same as the nozzle of FIGURE 1. In other words, the only difference between the nozzle A and the nozzle A$^a$ and A$^b$ consists in the shortening of the nozzle bodies to make way for an electrically heated hot runner 80 which is located in a socket or recess 81 of the mold part 73 and which has therein a plastic travel passageway 82 with openings leading into the passageways 22$^a$ of the nozzles A$^a$ and A$^b$. The runner 80 is provided with an entrance duct 84. Hot runners such as this are used in the art; the steel runner branching out into two or more mold unit sites; the runner being usually cartridge electrical resistance heated and insulated either by air gaps or other insulation to prevent heat loss into the mold plate. The novel feature of the runner assemblage of FIGURE 7 consists in the location of the improved valves A$^a$ and A$^b$ at the mold site locations.

A main heating cylinder 90 may be provided for nozzle control of the plastic into the entrance duct 84, and to that end it may have a conventional main heater nozzle 91 which seats in a socket upon the runner 80, as shown in FIGURE 7. In lieu of the nozzle 91, I can use one of the nozzles similar to the nozzle A of FIGURE 1, or modified thereover insofar as its attachment to the main heater cylinder is concerned, if the heater cylinder is to be made retractable. The heater cylinder 90 includes the usual plastic flow passageway 93 therethrough and the ram 94 which is shown in forward position. The usual feed hopper 95 is provided for feed of the thermoplastic material into the passageway 93.

In conventional runner and hot runner molds, the runner and sprues must be removed along with the molded part. While excess plastic material can be ground up and re-used, this takes time and the material deteriorates. Plastic material is saved by locating the valves A$^a$ and A$^b$ directly at the molding sites.

FIGURE 8 shows a retracting heating cylinder application of the improved valve assemblage. In this form of invention a base or platen 100 is provided against which the part 101 of the mold unit assemblage 102 is seated; the other mold unit assemblage 103 being formed complementary to provide a mold space 104 adapted to receive the plastic. The mold unit 103 is provided with the usual nozzle socket 104 which receives the improved automatic valve and degate nozzle A$^c$. In this nozzle A$^c$ the nozzle body 21$^b$ is provided with a spherical or tapered nozzle seat 106 at the end of body 21$^b$ and is shaped to seat in a registering or locating ring or plate 107. The latter is also provided with a nozzle seat 109 therein.

The heating cylinder 110 of FIGURE 8 is retractable (the means for retracting not being shown). It is provided with a coupling 111 by means of which to attach a nozzle A$^d$ which may be screw threaded at 112 into the coupling 111, but which otherwise has the same associated valve and spring features as the nozzle A in the form of invention shown in FIGURE 1. The valve end of the body of nozzle A^d is shaped to conform to and seat snugly against the surfaces of seats 106 and 109.

In the form of invention shown in FIGURE 8, valves are located in the main heater cylinder 110 and in the mold unit 103. The purpose of the valve A^d upon the inner cylinder 110 is to prevent drool of the plastic upon retraction of the cylinder.

It will be apparent from the foregoing that the improved automatic valve and degate nozzle and its various applications make it possible to obtain a better plastic part at greater speed than is capable of being achieved with conventional runner and gate assemblies. Furthermore, the flow of the plastic is circular and thus the flow of the plastic into the cavity is increased while at the same time preventing jutting of the material across the cavity and the resultant weld line. The improved valve and nozzle assembly permits immediate ram retraction, resulting in faster cycle operation, because with conventional gates it is necessary to hold the ram on injection pressure until the gate freezes off. Furthermore, the improved valve and nozzle assemblage provides a molded part of better appearance with a surface finish which does not have to be cut or milled off.

The improved valve and nozzle assemblage will give the best molding conditions for all types of plastic materials. Since large outlet openings have to be provided when using such plastics as acrylics, it will not be necessary to waste time for gate freeze off. Furthermore, the valve and nozzle assembly of this invention eliminates sinks in the molded part. There are no moving parts (other than the flexing of the spring and the reciprocation of the valve) to become worn and leak plasticized material. The valve is self-cleaning due to the fast movement of the plastic material through an annular duct; there being no hidden corners which will hold material and contaminate the color or material used.

Various changes in the size, shape and arrangement of parts may be made to the form of invention herein shown and described, without departing from the spirit of the invention or scope of the claims.

I claim:

1. In a valve and degate nozzle for thermoplastic injection molding machines, the combination of a nozzle body having a plastic flow passageway therethrough and an opening therefrom defining a valve seat, a valve slidably disposed in said passageway having a head adapted to engage said seat to close off the passageway, relatively spaced lugs carried by each of the valve and the nozzle body in aligning relation along the passageway of said nozzle body to limit the travel of said valve along the passageway, and non-turnable but longitudinally stretchable spring means connecting the nozzle body to said valve normally holding the valve closed and maintaining said lugs of the valve and nozzle body in relatively aligned relation whereby to limit the degree of opening movement of the valve.

2. In an injection machine assembly, the combination of a mold unit having a socket therein, a nozzle in said socket, a reciprocating valve in the nozzle for controlling flow of plastic material from said nozzle, spring means to normally close the valve, a retractable heating cylinder having a plastic travel chamber therein, a nozzle carried by said cylinder having a passageway therein, a reciprocating valve in the cylinder nozzle, spring means to normally close the cylinder nozzle valve, said retractable cylinder nozzle having a complementary releasable mating and seating engagement with the inlet end of said first mentioned nozzle at the valving outlet end of the cylinder nozzle.

3. An injection machine assembly as defined in claim 2 in which the springs of both the first and second mentioned nozzles are under tension both in the closed and opened positions of their respective valves.

4. An injection machine assembly as described in claim 3 in which a register and locating ring is mounted between the two nozzles for locating the same in a mating relation for flow of plastic without leakage from the cylinder nozzle into the mold mounted nozzle.

5. In a plastic injection machine assemblage, the combination of a mold unit provided with a molding cavity and having a socket therein with a convergently tapered surface leading to an outlet opening, a nozzle body having a plastic flow passageway therethrough, said nozzle body at its outlet end having a convergent tapered outer surface seated upon said tapered surface of the mold in intimate surface contact therewith, said nozzle body having a bottom surface lying in facing relation with the mold cavity, said nozzle body having an annular outwardly flaring outlet opening for said passageway, a valve having a tapered frusto conical head seated in said outlet opening of the nozzle body with the head outer surface lying flush with the outer surface of said nozzle body when the valve is completely closed, and spring means carried by the nozzle body normally closing said valve.

6. In a valve and degate nozzle for thermoplastic injection molding machines, the combination of a nozzle body having a passageway therethrough for receiving flowing plastic under pressure, said body having a discharge opening defining a valve seat, a valve reciprocably disposed in said passageway having a head shaped to engage said seat upon inward movement of the valve to shut off said opening, and a tensioned longitudinally flexible spring connected to the body at one end and at its other end being connected to said valve, said spring comprising a resilient leg of longitudinally zig zag shape whereby the same may be longitudinally extended and retracted without twisting.

7. In a valve and degate nozzle for thermoplastic injection molding machines, the combination of a nozzle body having a passageway therethrough for receiving flowing plastic under pressure, said body having a discharge opening defining a valve seat, a valve reciprocably disposed in said passageway having a head shaped to engage said seat upon inward movement of the valve to shut off said opening, a tension type spring comprising a substantially U-shaped body portion defining a pair of legs connected by a bight portion, said legs at their ends remote from the bight being connected to opposite sides of the body of the nozzle spaced from said valve so the spring will not bodily twist, and the bight of said spring being connected to said valve, said legs throughout their lengths being zig zag shaped for endwise resilient extension and retraction and normally under tension at all times even when the valve head is closed upon said opening.

8. In a multiple mold site hot runner assemblage for thermoplastic injection molding machines, the combination of a mold unit assemblage having a plurality of molding sites, a hot runner member seated upon said mold assemblage having a plastic inlet duct and a plastic travel passageway leading to said molding sites, and a valve and degate nozzle mounted upon said mold unit assemblage at each of said molding sites each comprising a nozzle body having a passageway therethrough for receiving flowing plastic and a discharge opening tapered convergently outward and opening upon a flat surface at the bottom of said body, a valve reciprocally disposed in said passageway having a tapered head for engaging said tapered discharge opening and having a bottom surface lying flush with the adjacent bottom surface of the mold body surrounding said discharge opening, a spring connected to the nozzle body located in the passageway and mounting said valve in position so that it can be reciprocated, the force of the spring normally seating the head of the valve upon the body discharge opening, and means mounted upon said valve and upon the passageway walls of the nozzle body limiting the opening movement of said valve.

References Cited in the file of this patent

UNITED STATES PATENTS

| | | |
|---|---|---|
| 1,955,029 | Smallhouse | Apr. 17, 1934 |
| 2,422,990 | Spanier | June 24, 1947 |
| 2,550,356 | Jarvis | Apr. 24, 1951 |
| 2,668,325 | Goodwin | Feb. 9, 1954 |
| 2,673,730 | Hupp | Mar. 30, 1954 |
| 2,750,185 | Moore | June 12, 1956 |
| 2,756,106 | Schenk | July 24, 1956 |
| 2,770,011 | Kelly | Nov. 13, 1956 |
| 2,777,164 | Strahm | Jan. 15, 1957 |
| 2,832,641 | Korda | Apr. 29, 1958 |
| 2,888,037 | Jones et al. | May 26, 1959 |